US012715282B2

(12) United States Patent
Matijevich et al.

(10) Patent No.: US 12,715,282 B2
(45) Date of Patent: Aug. 25, 2026

(54) PROCESS FOR DEVELOPING FUEL SYSTEMS

(71) Applicants: Mark Matijevich, Chino, CA (US); Tony Matijevich, Chino, CA (US); Terry McCrea, Chino, CA (US)

(72) Inventors: Mark Matijevich, Chino, CA (US); Tony Matijevich, Chino, CA (US); Terry McCrea, Chino, CA (US)

( * ) Notice: Subject to any disclaimer, the term of this patent is extended or adjusted under 35 U.S.C. 154(b) by 0 days.

(21) Appl. No.: 18/215,996

(22) Filed: Jun. 29, 2023

(65) Prior Publication Data

US 2023/0339311 A1 Oct. 26, 2023

Related U.S. Application Data

(63) Continuation of application No. 16/678,068, filed on Nov. 8, 2019, now Pat. No. 11,701,965, which is a continuation of application No. 15/379,870, filed on Dec. 15, 2016, now Pat. No. 10,486,530.

(60) Provisional application No. 62/271,807, filed on Dec. 28, 2015.

(51) Int. Cl.

| | |
|---|---|
| ***B60K 15/07*** | (2006.01) |
| *B60K 15/03* | (2006.01) |
| *B60K 15/063* | (2006.01) |

(52) U.S. Cl.

CPC .... *B60K 15/07* (2013.01); *B60K 2015/03118* (2013.01); *B60K 2015/03309* (2013.01); *B60K 2015/03407* (2013.01); *B60K 2015/0639* (2013.01)

(58) Field of Classification Search

CPC .... B60K 15/063; B60K 15/067; B60K 15/07; B60K 2015/03118; B60K 2015/03164; B60K 2015/03309; B60K 2015/03315; B60K 2015/03407; B60K 2015/0639

USPC .......................................................... 280/834

See application file for complete search history.

(56) References Cited

U.S. PATENT DOCUMENTS

| | | | | |
|---|---|---|---|---|
| 5,443,578 | A * | 8/1995 | Davis, Jr. | B60K 15/03006 280/830 |
| 7,189,040 | B2 * | 3/2007 | Sharp | B60R 19/00 410/42 |
| 8,302,997 | B2 * | 11/2012 | Veenstra | B60K 15/07 280/832 |
| 9,243,527 | B2 * | 1/2016 | Bidner | F01M 13/028 |
| 9,266,642 | B2 * | 2/2016 | Prakash | B65D 13/00 |
| 9,976,523 | B2 * | 5/2018 | Sarikaya | F02M 21/0242 |
| 2009/0152043 | A1 * | 6/2009 | Lee | B60K 15/07 280/834 |
| 2014/0069972 | A1 * | 3/2014 | Willemsen | B60K 15/063 224/401 |

OTHER PUBLICATIONS

Composites World article, found at https://www.compositesworld.com/articles/cng-tanks-pressure-vessel-epicenter . (Year: 2014).*

* cited by examiner

*Primary Examiner* — John D Walters

(57) ABSTRACT

An apparatus and a method are provided for a compressed natural gas fuel system configured to replace a motor vehicle's fuel system comprising a storage assembly comprising an enclosure, wherein the enclosure contains a plurality of tanks configured to contain compressed natural gas; and a chassis disposed within the enclosure and configured to retain the plurality of tanks, wherein the storage assembly is configured to be mounted to the roof of a motor vehicle.

19 Claims, 3 Drawing Sheets

PROCESS FOR DEVELOPING FUEL SYSTEMS

PRIORITY

This application claims the benefit of and priority to U.S. patent application Ser. No. 16/678,068 filed on Nov. 8, 2019, U.S. patent application Ser. No. 15/379,870 filed Dec. 15, 2016, issued U.S. Pat. No. 10,486,530 on Nov. 26, 2019 and U.S. Provisional Application filed on Dec. 28, 2015 and having application Ser. No. 62/271,807.

FIELD

The field of the present disclosure generally relates to fuel systems. More particularly, the field of the present disclosure relates to an apparatus and a method for substituting a compressed natural gas fuel system in place of a motor vehicle's gasoline fuel system so as to reduce emissions and lower the fuel costs associated with operation of the motor vehicle.

BACKGROUND

A majority of the motor vehicles on the road today operate via gasoline fuel systems provided by an original equipment manufacturer (OEM). Per recent estimates, there are approximately 253 million motor vehicles on roads in the United States. With the expected increases in population and urbanization, this number is only expected to grow further, thereby increasing the output of harmful emissions and increased consumption of gasoline made from crude oil.

As motor vehicles have become increasingly popular, alternative fuel sources have been considered so as to have a lower impact on the environment. One alternative fuel source is natural gas. Natural Gas is a fossil fuel that exists in a gaseous state and is composed mainly of methane (CH4) and a small percentage of other hydrocarbons (e.g. ethane). Natural gas may come in either compressed natural gas (CNG) form, or as liquid natural gas (LNG). CNG is a readily available alternative to gasoline that is made by compressing natural gas to less than 1% of its volume at standard atmospheric pressure. Consisting mostly of methane, CNG is odorless, colorless and tasteless. The use of natural gas is becoming increasingly popular as it may be used with commercial, industrial, electric power generation and residential applications. Various schools, hospitals, hotels, motels, restaurants, office buildings also use natural gas for cooking and water and space heating.

The advantages of using natural gas are well documented. For example, as compared to petroleum or coal, natural gas causes less damage to the environment. Since natural gas is comprised of methane, it results in lower carbon emissions. In fact, emissions of carbon dioxide are 45% less than other conventional fuels and 30% less than oil. Furthermore, when used for fueling a motor vehicle, natural gas is generally cheaper as compared to diesel or gasoline. Natural gas is also relatively abundant as compared to other fossil fuels, and easier to distribute.

Due to its benefits, operators of motor vehicles may find it desirable to use natural gas as compared to gasoline. Unfortunately, one cannot simply use natural gas if their vehicle is configured to accept gasoline. As will be appreciated, fueling stations for gasoline and compressed natural gas are quite different, as each station is configured to couple with a gasoline fuel system or a compressed natural gas fuel system, respectively. Indeed, attempting to use compressed natural gas with a gasoline fuel system, or gasoline with a compressed natural gas system would cause significant injury to the user and their vehicle.

What is needed, therefore, is a fuel system that substitutes the conventional fuel system of a motor vehicle that is simple to install onto a wide variety of makes and models, so as to help motor vehicle owners reduce emissions and fuel costs.

BRIEF DESCRIPTION OF THE DRAWINGS

The drawings refer to embodiments of the present disclosure in which.

Figure 1:
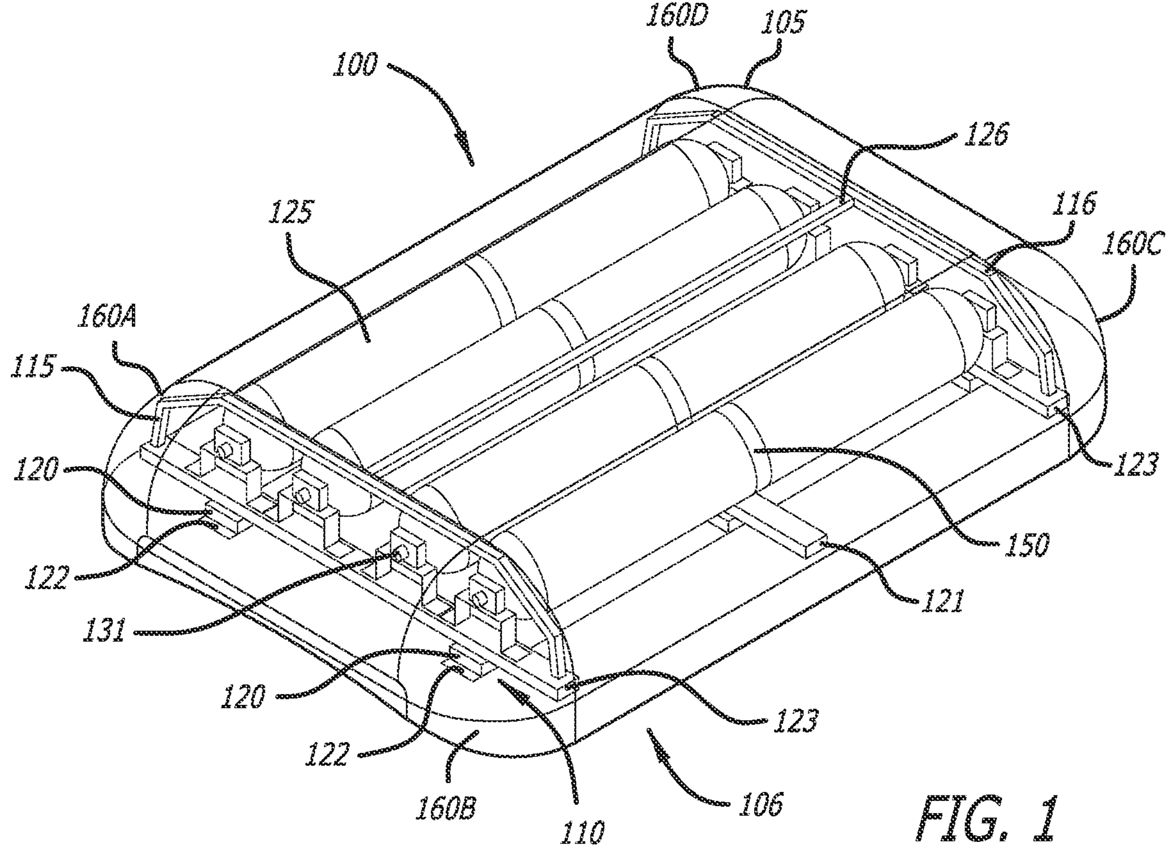
FIG. 1 is a perspective view illustrating an exemplary embodiment of the storage assembly comprising an enclosure containing a plurality of tanks, according to the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein. Finally, as used herein, the term "motor vehicle" means any car, truck, van, bus, or hybrid alone, or in combination, without limitation. Preferably, the storage assembly 100 is configured to be disposed on a particular chassis, such as the FORD® E-450, FORD® F-550 and the CHEVROLET® G4500 chasses, without limitation. It should be appreciated, therefore, that the dimensions of the storage assembly and the components housed therein may be varied without limitation.

In general, the present disclosure describes an apparatus and a method for substituting a CNG fuel system in place of a motor vehicle's fuel system so as to reduce emissions and lower the fuel costs associated with operation of the motor vehicle. A storage assembly comprising a plurality of tanks is generally configured to be disposed on the roof of the motor vehicle. By installing the storage assembly 100 on the roof of the vehicle, dangers associated with "rear-end" accidents, for example, may be significantly decreased. Moreover, it is envisioned that "wearable" components such as brakes, pads, and the like may have an extended life due to the potential changes in weight, dynamics, and weight distribution using the embodiments as discussed further herein.

FIG. 1 is an upper perspective view illustrating an exemplary embodiment of the storage assembly 100 comprising a substantially hollow enclosure 105, wherein a plurality of tanks 125 are disposed. In one embodiment, the enclosure 105 is configured to be mounted to the roof of the vehicle, and as such, the enclosure 105 has a generally smooth shape featuring rounded corners 160A-160D, so as to minimize the introduction of any aerodynamic drag when installed thereon. Although shown as a generally rectangular prism, shapes of varying dimensions and styles may be used without limitation according to the present disclosure. The enclosure 105 may be produced using any number of methods, including without limitation, injection molding, 3D-printing, and the like. In one embodiment, the enclosure 105 may include adequate fastening means including without limitation any of various brackets, washers, bolts, and the like.

As shown in FIG. 1, the enclosure 105 is adapted to house a plurality of non-permeable cylindrical tanks 125 that are desirably configured to retain CNG, for example. It will be appreciated that if greater CNG capacity is required for an application, a larger enclosure 105 and corresponding tanks 125 may be provided. In one embodiment, the bottom 106 of the enclosure 105 may be configured so as to match the body lines of the roof of the motor vehicle, providing a more contoured fit. Indeed, the shape of the bottom 106 of the enclosure 105 may be configured to the shape of the particular application. The enclosure 105 may comprise any number of materials, including without limitation, plastic, rubber, various polymers, metal, carbon fiber, titanium, or any combination thereof. Preferably, the enclosure 105 is self-contained and unitary in construction so as to prevent gas leaks and protect the tanks for the various environmental elements, including, for example, rain, wind and snow In one embodiment, the enclosure 105 may be modular, such that portions of the enclosure 105 may be removed and/or otherwise replaced as necessary. It is envisioned that various panels may also be included with the enclosure 105 so as to provide quick access to components housed therein.

A chassis 110 is generally disposed within the substantially hollow enclosure 105, so as to retain the plurality of tanks 125. While a primary function of the chassis 110 is to provide increased rigidity and stability to the enclosure 105, the chassis 110 is also configured so as to prevent/minimize any damage to the plurality of tanks 125 in an accident scenario, for example. In one embodiment, the chassis 110 features a pair of stabilization members 115, 116; a plurality of support members 120; a fastening member 121; a plurality of link members 122, 123 configured so as to stabilize the tanks 125 of the storage assembly 100; and a cross member 126. The stabilization members 115, 116 and the fastening member 121 may be coupled to the support members 120 using any number of techniques, including welding, or they may be attached to one another using any type of fastener and/or adhesive. In one embodiment, the chassis 110 is comprised of metal, although it is contemplated that any type of material may be used. It should be appreciated that utilizing a lighter weight material is preferred so that the overall weight and impact of the storage assembly 100 is minimized. In one embodiment, the support members 120 comprise attachments 122 that are contoured so as to match the shape of the bottom 106 of the enclosure 105. Preferably, the attachments 122 are fastened or otherwise mated to the enclosure 105. In one embodiment, the attachments 122 may include means to fasten the storage assembly 100 to the roof of the motor vehicle.

In one embodiment, the plurality of support members 120 are arranged such that they are perpendicular with respect to the fastening member 121. As shown in FIG. 1, the fastening member 121 extends longitudinally beyond the support members 120. A plurality of brackets 150 are configured to retain the plurality of tanks 125. Preferably, the brackets 150 are configured to couple with the fastening member 121 to prevent movement of the tanks 125. Although the brackets 150 are shown as having a generally annular configuration, the brackets 150 may be provided for in any form, and may also be adjustable, thereby providing superior fit with respect to tanks of varying sizes and shapes. In one embodiment, the brackets 150 may comprise a clamping mechanism so as to quickly install, remove and/or otherwise replace the plurality of tanks 125. The brackets 150 may comprise any number of materials, including without limitation, plastic, rubber, various polymers, metal, carbon fiber, titanium, or any combination thereof. Preferably, one bracket is used for each tank 125, however, it is contemplated that a single bracket may be used to retain more than one tank 125.

Preferably, the plurality of tanks 125 are disposed longitudinally within the enclosure 105 and are configured to contain CNG. It is envisioned that the tanks 125 may comprise any of various types without extending beyond the spirit and scope of the present disclosure. Consequently, the tanks 125 may feature a substantially metallic construction, such as steel. In one embodiment, the tanks 125 comprise aluminum with a fiber-reinforced polymer overwrap featuring glass, carbon or basalt fiber. In one embodiment, the tanks 125 comprise a metal liner with full carbon fiber composite overwrap, wherein the composite overwrap is configured to carry one or more structural loads. In one embodiment, the tanks 125 may feature a metal-free construction, wherein, for example, a carbon fiber or hybrid carbon/glass fiber composite is wound over a thermoplastic polymer (typically HDPE or polyamide). In one embodiment, the tanks 125 comprise an all-composite construction, wherein the tanks 125 do not include a liner, and features a carbon fiber or hybrid carbon/glass fiber composite wound over a collapsible or sacrificial mandrel.

In one embodiment, valve members 131 are disposed at the proximal end 130 of each tank 125 so as to deliver CNG to the respective fueling components of the motor vehicle. The valve members 131 may be controlled manually or electronically without limitation. In one embodiment, four tanks 125 are disposed within the enclosure 105, however, any number of tanks may be used depending on the application. For example, for larger vehicles, tanks 125 having a larger capacity may be used. For vehicles having a larger height, a lower profile enclosure 105 may be desirable. Consequently, smaller tanks 125 may be used in such applications. In one embodiment, four tanks 125 are disposed within the enclosure 105. It will be appreciated that the tanks 125 may be arranged at varying or equal distances with respect to one another.

In general, the tanks 125 may be configured so as to withstand impact and resist puncture, similar to fuel tanks that are conventionally found on the underbody of a motor vehicle. Accordingly, in one embodiment, the storage assembly 100 may be used without the enclosure 105.

Although the tanks 125 may comprise any number of materials alone or in combination, it is preferable to use a metal, such as aluminum or steel. In another embodiment, the tanks 125 may be partially and/or fully enclosed with a fibrous material and/or a carbon composite. In one embodiment, the tanks 125 feature a pressure rating of substantially 3000 psi (pounds per square inch), or substantially 200 bar pressure, however, it is envisioned that the tanks 125 may feature a cylinder pressure of substantially 3600 psi (250 bar pressure). In general, it should be understood that the higher the pressure rating of the tanks 125, the more CNG capacity, and hence, the longer distances that may be driven without requiring a re-fill of CNG.

Figure 2:
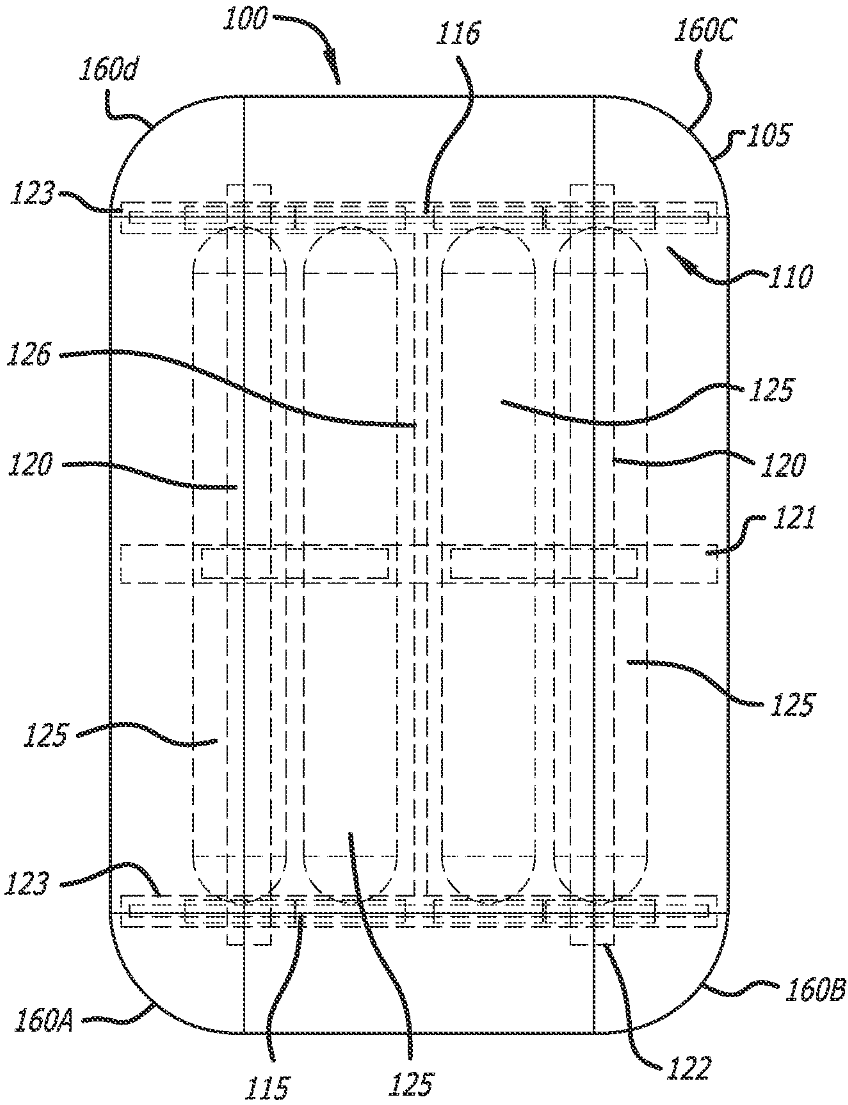
FIG. 2 is a top perspective view illustrating the exemplary storage assembly comprising an enclosure containing a plurality of tanks in FIG. 1 in accordance with the present disclosure.

As shown in FIG. 2, in one embodiment the storage assembly 100 has a length 170 of substantially 125.60" and a width 180 of substantially 83.00". It is to be appreciated that the ratio between the length and width of the storage assembly 100 may be varied as necessary. For example, the tanks 125 generally have a capacity between substantially 5 and 15 GGE (gasoline gallon equivalent) worth of standard gasoline. However is it contemplated that much larger tanks 125 may be used, such as 24 GGE or higher variants. As a data point, typically the 15 GGE tanks have a diameter of substantially 19 inches, and a length of substantially 60 inches. Consequently, depending on the capacity of the tanks 125 that are used, the length and width of the storage assembly 100 may be varied.

Figure 3A:
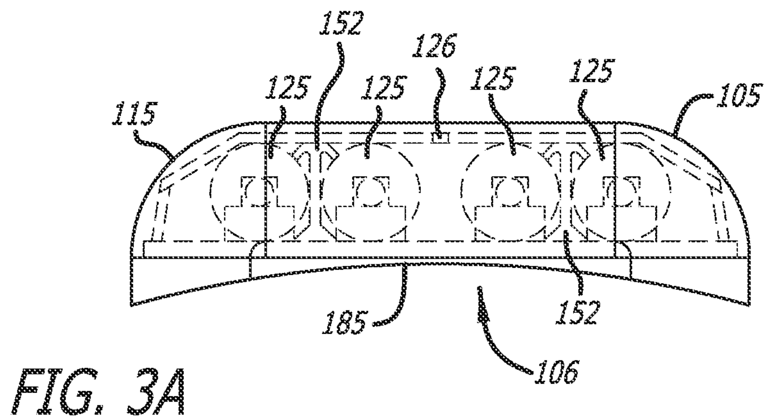
FIGS. 3A-3B are side plan views illustrating the exemplary storage assembly comprising an enclosure containing a plurality of tanks in FIG. 1 in accordance with the present disclosure.
Figure 3B:
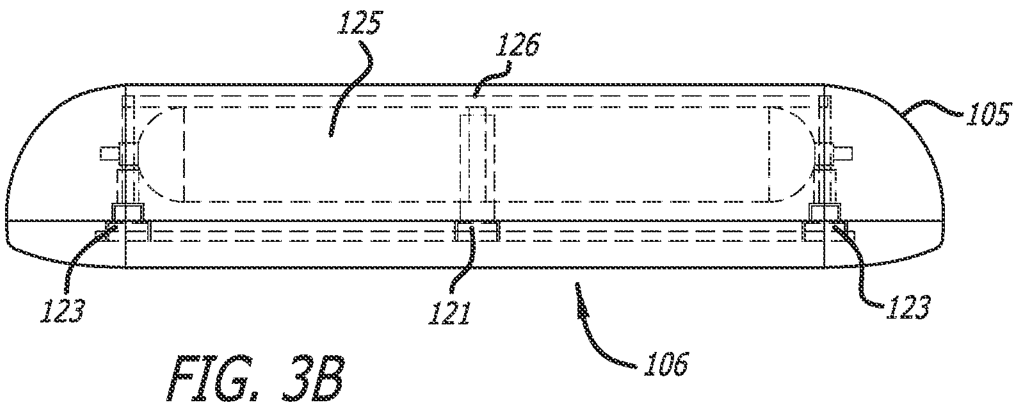

Similarly, as shown in FIG. 3A, in one embodiment the chassis 110 may have a width 190 of substantially 80.00". The bottom 106 of the enclosure 105 features a rounded panel 185 that may be contoured or formed as necessary based on the vehicle to which the assembly 100 is to be installed. Furthermore, in one embodiment, a plurality of dividing members 152 may be disposed in between the plurality of tanks 125, thereby increasing the rigidity of the chassis 110, while also providing. As shown in FIG. 3B, the chassis may have a height 200 of substantially 18.12".

It will be appreciated that the installation of the storage assembly 100 requires removal of the OEM gasoline fuel system from a user's motor vehicle. Consequently, a full review of the chassis and body specifications of the specific vehicle must be verified to ensure optimal integration of the storage assembly 100. Thereafter, the OEM fuel system may be removed and any redundant fuel system components may be stripped. Once the OEM fuel system is removed, the tanks 125 are selected according to the application, as referenced above. In a preferred embodiment, safety equipment such as gravel shields may be installed to protect the tanks 125. Finally, extensive diagnostic testing may be performed to ensure proper drivability of the converted vehicle.

Furthermore, it is to be understood that embodiments of the present disclosure are configured to function with conventional CNG fuel systems. Conventional CNG fuel systems generally comprise a flow line that connects the tanks 125 and an internal combustion engine of the motor vehicle, along with a regulator configured to regulate high-pressure gas from the tanks 125. In one embodiment, a solenoid valve may be installed and configured to open or close according to signals from an electronic control unit (ECU) of the motor vehicle. Preferably, a second regulator for regulating low-pressure gas is also included, along with a flow controller for adjusting gas introducing into the engine. In one embodiment, disposed between the vehicle tank and the engine is a fuel regulator that is configured to reduce the fuel-tank pressure of 3600 psi to a usable 125 psi delivered to the engine. The fuel regulator may be heated so as to prevent freezing from the expansion of the compressed natural gas, which may be routed through a parallel fuel rail. Typically, natural gas runs at an ideal air/fuel ratio of approximately 16.8:1, whereas gasoline runs at approximately a slightly lower ratio. In one embodiment, the flow and usage of CNG may be controlled using an electronic control unit. The electronic control unit may be configured to communicate with any number of valve members 131 and pressure gauges or sensors that indicate the pressure in each of the tanks 125.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

The invention claimed is:

1. A CNG fuel system for a vehicle, comprising:

an enclosure for mounting onto a roof of the vehicle;

the enclosure comprising a smooth shape including rounded corners at each end;

a chassis disposed within the enclosure;

a first link member positioned at a proximal end of the chassis between the roof of the vehicle and the plurality of tanks;

a first stabilization member connected to the first link member, a second link member positioned at a distal end of the chassis between the roof of the vehicle and the plurality of tanks, a plurality of support members;

a second stabilization member connected to the second link member, and a cross member that extends between the first stabilization member and the second stabilization member, wherein neither the first stabilization member nor the second stabilization member are in contact with the plurality of tanks;

a plurality of tanks mounted onto the chassis, wherein the plurality of tanks each comprises aluminum with a fiber-reinforced polymer overwrap featuring glass, carbon or basalt fiber;

the overwrap configured to carry one or more structural loads;

and a valve member coupled with each of the plurality of tanks;

wherein the plurality of tanks are mounted to the chassis at a location entirely between the first stabilization member and the second stabilization member.

2. The fuel system of claim 1, wherein the enclosure is configured to minimize aerodynamic drag during operation of the vehicle.

3. The fuel system of claim 1, wherein the enclosure includes a bottom that is configured to provide a contoured fit onto the roof.

4. The fuel system of claim 1, wherein the enclosure comprises a unitary construction configured to prevent gas leaks and to protect the plurality of tanks from environmental exposure.

5. The fuel system of claim 1, wherein the enclosure includes one or more panels configured to provide quick access to components within the enclosure.

6. The fuel system of claim 1, wherein the chassis is configured to provide increased rigidity and stability to the enclosure.

7. The fuel system of claim 1, wherein the chassis comprises: two or more stabilization members; a fastening member; and a plurality of link members configured to stabilize the plurality of tanks.

8. The fuel system of claim 7, wherein the two or more stabilization members and the fastening member are configured to be fixedly coupled to the plurality of support members.

9. The fuel system of claim 1, wherein the plurality of support members comprise attachments that are configured to match the shape of a bottom of the enclosure.

10. The fuels system of claim 9, wherein the attachments are configured to provide a means for fastening the enclosure to the roof.

11. The fuel system of claim 1, wherein a plurality of brackets are configured to couple the plurality of tanks with the fastening member.

12. The fuel system of claim 11, wherein a clamping mechanism is incorporated into each of the plurality of brackets to enable quick installation and removal of the plurality of tanks.

13. The fuel system of claim 1, wherein the plurality of tanks each comprises an all-composite construction comprising a carbon fiber or hybrid carbon/glass fiber composite wound over a collapsible or sacrificial mandrel.

14. The fuel system of claim 1, wherein the plurality of tanks each comprises a substantially metallic construction.

15. The fuel system of claim 14, wherein the plurality of tanks each comprises a metal liner with a full carbon fiber composite overwrap.

16. The fuel system of claim 1, wherein each of the plurality of tanks has a fuel capacity ranging between about 5 GGE and about 25 GGE.

17. The fuel system of claim 16, wherein each of the plurality of tanks has a fuel capacity of about 15 GGE.

18. A CNG fuel system for a vehicle, comprising:

an enclosure for mounting onto a roof of the vehicle;

the enclosure comprising a smooth shape including rounded corners at each end;

a chassis disposed within the enclosure;

a plurality of tanks mounted onto the chassis;

a first link member positioned at a proximal end of the chassis between the roof of the vehicle and the plurality of tanks;

a first stabilization member connected to the first link member, a second link member positioned at a distal end of the chassis between the roof of the vehicle and the plurality of tanks;

a second stabilization member connected to the second link member;

a fastening member positioned between the first link member and the second link member;

at least one bracket coupled with the fastening member configured to retain at least one tank of the plurality of tanks; and a cross member that extends between the first stabilization member and the second stabilization member.

19. A CNG fuel system for a vehicle, comprising:

an enclosure for mounting onto a roof of the vehicle;

the enclosure comprising a smooth shape including rounded corners at each end;

a chassis disposed within the enclosure;

a plurality of tanks mounted onto the chassis;

a first link member positioned at a proximal end of the chassis between the roof of the vehicle and the plurality of tanks;

a first stabilization member connected to the first link member, a second link member positioned at a distal end of the chassis between the roof of the vehicle and the plurality of tanks; and a second stabilization member connected to the second link member;

wherein at least one tank of the plurality of tanks are mounted to the chassis at a location entirely between the first stabilization member and the second stabilization member.

* * * * *